United States Patent [19]
Wallaart et al.

[11] Patent Number: 5,199,551
[45] Date of Patent: Apr. 6, 1993

[54] BEND SEGMENT FOR A CHAIN CONVEYOR

[76] Inventors: Jacobus J. Wallaart, Esdoornstraat 41, 2691 VG 's-Gravenzande; Constantinus P. J. M. Vermeulen, 2e Middellandstraat 2, 3021 BM Rotterdam, both of Netherlands

[21] Appl. No.: 869,685

[22] Filed: Apr. 16, 1992

[30] Foreign Application Priority Data

Apr. 19, 1991 [NL] Netherlands ............... 9100690

[51] Int. Cl.$^5$ .............................................. B65G 15/60
[52] U.S. Cl. ................... 198/805; 198/831; 198/852
[58] Field of Search ............... 198/805, 831, 852, 853

[56] References Cited

U.S. PATENT DOCUMENTS

| | | | |
|---|---|---|---|
| 4,643,298 | 2/1987 | Wallaart | 198/805 |
| 4,742,906 | 5/1988 | Wallaart | 198/805 |
| 4,805,764 | 2/1989 | van Zijderveld, Jr. | 198/805 |
| 4,823,939 | 4/1989 | Langhans et al. | 198/805 |
| 5,027,942 | 7/1991 | Wallaart | 198/805 |
| 5,036,969 | 8/1991 | Garbagnati | 198/805 |

FOREIGN PATENT DOCUMENTS 8901563 8/1989 Fed. Rep. of Germany .

Primary Examiner—D. Glenn Dayoan
Attorney, Agent, or Firm—Morgan & Finnegan

[57] ABSTRACT

A bend segment for a chain conveyor having a substantially U-shaped plastics element. The legs (2,3) of the U-shaped element form the rails over which the chain can move. The chain contains links (4) each having a substantially rectangular bearing surface and a connection system (5,6) located below the bearing surface. The successive links are pivotally coupled to each other through the connection systems. The links are composed of at least partly of a magnetizable material. Permanent magnets (8',8'') are arranged at least in the connecting portion (12) between the legs of the U-shaped element. The permanent magnets (8) are arranged in chambers, closed at the top, formed in the bottom surface (1) of the U-shaped plastics element. The chambers and the magnets (8) extend in the bottom on opposite sides of the connecting portion over a substantial part of the width of the legs (2,3) of the U-shaped element.

12 Claims, 2 Drawing Sheets

BEND SEGMENT FOR A CHAIN CONVEYOR

BACKGROUND OF THE INVENTION

This invention relates to a bend segment for a chain conveyor comprising a conveyor chain movable over a track including at least one bend zone, the bend segment consisting of at least one substantially U-shaped plastics element and the legs of the U-shaped element forming the rails over which the chain can move, while the chain comprises links each comprising a substantially rectangular bearing surface and a connection system located below the bearing surface, the successive links being pivotally coupled to each other through the connection systems thereof and consisting at least partly of a magnetizable material, and permanent magnets are arranged at least in the connecting portion between the legs of the U-shaped element.

Such a bend segment for a chain conveyor is disclosed in European patent application EP-A-0.286.173. This bend segment is suitable for a chain conveyor over which runs a chain whose links are substantially made of plastics, while the permanent magnets exert a downward force on the hinge pins which couple the connection systems of the successive links, in order that the links are retained flat on the track of the chain conveyor in the bend zones thereof. Without magnets or other means for keeping the chain links flat, these links tend to come off in the bend zones on the outside of the rails as a result of the pull exerted on the chain, which is naturally undesirable.

Although the bend segment disclosed in EP-A-0.286.173 works very well in practice, a drawback thereof is that it is rather expensive to manufacture. In the design of this bend segment as it is marketed, the magnets are arranged in groups of four in a plastics frame and a bend segment comprises a plurality of these frames arranged in line with each other in a recessed space provided for that purpose in the top surface of the connecting portion between the legs of the U-shaped element, this recessed space continuing partly into the legs of the element. This means that the frames must be inserted one by one into the slot defining the space referred to. Furthermore, because it is unacceptable from the point of view of hygiene that there are gaps between the successive frames and between the frames and the rails, the top of the frames, after these have been arranged, is filled up with a liquid plastics, which, after hardening, is levelled by means of milling. It will be clear that these successive steps prevent an economical and hence inexpensive manufacture of the bend segments.

Further, it has been found in practice that it would be highly desirable if there were a bend segment for a chain conveyor which is suitable both for chains substantially made of plastics and for chains made entirely of steel, since this has the advantage that only one type of bend segment is to be kept in stock and that the user, also after installation of the chain conveyor, can freely choose between the use of steel chains and plastics chains.

The bend segment disclosed in EP-A-0.286.173 is less suitable for steel chains because in certain cases the magnets arranged in that bend segment do not exert sufficient force of attraction on the ends of the ferromagnetic bearing surfaces of the chain links in an outside bend, so that the links still have the tendency to come off the rails in the outside bend. In the known bend segment it is not possible to arrange for the magnets to extend further in lateral direction into the legs of the U-shaped element because this would have an unacceptable adverse effect on the mechanical strength of the bend segment. Nor is it possible to increase the magnetic force by using stronger magnets because in that case the force of attraction becomes too high for plastics chains, thereby causing undue wear. Finally, it is impossible to design the known bend segment to have the standardized height of 27 mm for steel chains.

German Gebrauchsmuster DE-U-89.01563 also describes a bend segment in which the magnets are arranged in the top surface of the connecting portion of a U-shaped plastics element. In fact, with this bend segment, the same problems occur when mounting the magnets as in the bend segment according to EP-A-0.286.173, while further this known bend segment has highly undesirable characteristics from the point of view of hygiene because the middle portion of the bend segment is not sealed in any manner after the magnets have been mounted, so that undesirable gaps are formed. It is true that it is described that the bend segment known from DE-U-89.01563 is suitable for guiding chains having a bearing surface of a magnetizable material, but if this is true at all, the bend segment is mechanically substantially weakened in that the magnets must extend far into the legs on opposite sides and, in view of the magnetic force required, the bend segment is not suitable for guiding substantially plastics chains because the hinge pins thereof would be subject to an excessive force of attraction. Finally, DE-U-89.01563 also shows radial ribs between the rails, but these ribs serve to connect the rails, with completely open spaces present between the ribs. Such a construction is mechanically very weak.

European patent application EP-A-0.159.074 discloses a bend segment that is intended for use with chains made from a ferromagnetic material. This bend segment also comprises a U-shaped plastics element and permanent magnets arranged in chambers formed for that purpose in the bottom of the legs of that element, these chambers extending into the vicinity of the top of the legs. During operation, the permanent magnets arranged in the chambers are pulled up by the material of the chain links against the tops of these chambers, whereby optimum attraction of the chain links is ensured. This known bend segment, however, is entirely unsuited for use with substantially plastics chains.

European patent application EP-A-0.207.577 also describes a bend segment which in fact is also suitable only for use with a chain made of a ferromagnetic material. In this bend segment, which is built up from several loose members and does not consist of a U-shaped element, the magnets are arranged around a bush interconnecting the rails. A magnetic circuit is formed with bushes and plates of a ferromagnetic material, in such a manner that the magnetic force, as in the manner of a horse-shoe type magnet, is concentrated in the top surface of the rails near the ferromagnetic bearing surfaces of the chain links.

SUMMARY OF INVENTION

One object of the invention is to provide a bend segment for a chain conveyor, which is suitable for use both with chains made from a magnetizable material and with chains substantially made from plastics, and which bend segment is considerably cheaper to manufacture than the bend segment known from EP-A-0.286.173, while yet possessing the same characteristics as the known bend segment in regard of the absence of gaps and the like on the side facing the chain and on the external lateral surfaces.

Another object of the invention is to provide a bend segment that is suitable to be largely manufactured automatically, particularly in that the magnets no longer need to be inserted into the bend segment by hand.

A further object of the invention is to provide a bend segment which at manufacture can be provided directly with so-called lead-in and lead-out portions which serve to guide the chains from the rest of the track of the chain conveyor into and out of the bend segment, respectively.

To realize the above-mentioned objects, the invention provides a bend segment of the type described, in which the permanent magnets are arranged in chambers closed at the top, formed for that purpose in the bottom surface of the U-shaped plastics element, these chambers being separated from each other by radially extending ribs, and the chambers and the magnets extend in the bottom surface on opposite sides of the connecting portion over a substantial part of the width of the legs of the U-shaped element.

It has been found that by the measures according to the invention it is possible, on the one hand, to provide for the magnets to extend further laterally in the bend segment, so that they can also exert a sufficient force of attraction on the bearing surfaces of metal chains in all cases, without the force of attraction exerted on the hinge pins of plastics chains increasing appreciably, while, on the other hand, due to the presence of plastics ribs between the adjacent chambers for receiving the magnets, the mechanical strength of the bend segment remains amply sufficient. Moreover, the arrangement of the magnets at the bottom of the bend segment has been found to be unexpectedly favourable for the course of the magnetic force.

BRIEF DESCRIPTION OF THE DRAWINGS

Further advantages of the invention will now be elucidated through the desription of an embodiment of the invention, with reference to the accompanying drawings, in which.

DETAILED DESCRIPTION OF THE INVENTION

Figure 1:
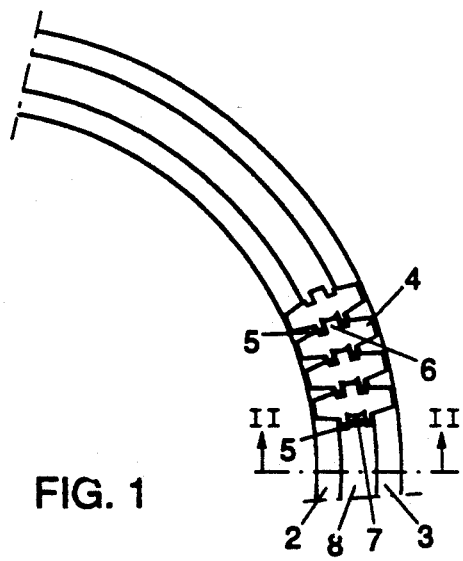
FIG. 1 is a top plan view of a single bend segment according to the invention, having disposed thereon a section of the conveyor chain.
Figure 2:
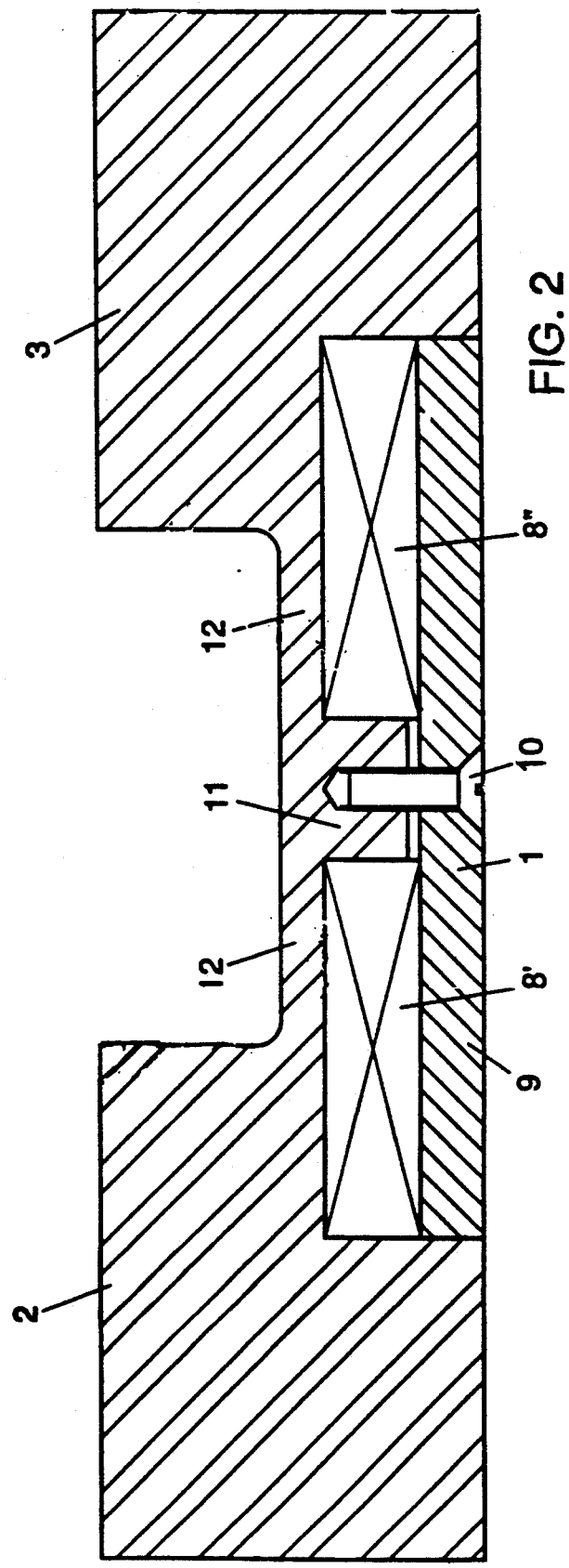
FIG. 2 is a cross-section of the bend segment taken on the line II—II of FIG. 1.

The bend segment according to the embodiment and as shown in FIGS. 1 and 2 is made entirely of plastics and, in the case of a single bend, has a U-shape in cross-section with a bottom portion 1 and two upright legs 2 and 3, whose top ends form the rails for the conveyor chain. This chain is composed of links 4 each having a bearing surface that is made of plastics or of magnetizable material, preferably ferromagnetic steel. The bearing surface is provided on one side with spaced hinge loops 5 and on the other side with a centrally located hinge loop 6. The hinge loops 5 and 6 are interconnected by means of a hinge pin 7, which, at any rate when the bearing surfaces are made of plastics, is made of a magnetizable and preferably ferromagnetic material.

In order to enable the chain to be readily lifted from the track in the bend segments as well, the maximum distance between the guide surfaces constituted by the outside of the hinge loops 5 is preferably smaller than the minimum distance between the oppositely located guiding surfaces constituted by the inside of the upright legs 2 and 3. In practice, the guiding surfaces on the hinge loops 5 will typically extend perpendicularly relative to the bearing surface of the chain links 4 and the insides of the legs 2 and 3 will also extend perpendicularly relative to the plane of the rails. This enables simple manufacture of both bend segment and chain links.

As can be clearly seen from FIG. 2, two permanent magnets 8' and 8" have been arranged in the bottom surface of the bend segment in chambers recessed in the bottom surface for that purpose. Mounted below the magnets 8' and 8" is a closure plate 9 for fixing the magnets in the bend segment. The closure plate is screwed to the bottom of the bend segment by means of a screw 10. Preferably, the closure plate 9 is made from a ferromagnetic material because it has been found that by providing such a closure plate, in the respective cases of a plastics chain and a steel chain, the force of attraction exerted on the hinge pins or the bearing surfaces increases, which, in principle, permits the use of smaller magnets or magnets of lesser magnetic force.

The present bend segment has a further, highly important and surprising advantage. It is true that if the bend segment is used for a steel chain, the force of attraction exerted on T the bearing surfaces of this chain by the magnets 8',8" when the chain rides flat on the rails is smaller than in the case of the bend segment according to European patent application 0.159.074, because the distance between the bearing surfaces and the magnets is larger. On the other hand, however, owing to this larger distance, the influence of any interference with the magnetic force exerted is considerably smaller. This can be illustrated by the following example.

In the bend segment according to European application 0.159.074 the distance between the top of the magnets and the steel bearing surface is about 2.5 mm. Let it be supposed, for convenience, that the magnetic attraction decreases quadratically with the distance, which is a very good approximation of the real decrease of the force of attraction. If the track is fouled, for instance by broken glass, which occurs very often in practice, a piece of glass having a diameter of 2.5 mm, for instance, will cause the chain to come off the top of the rails by a distance of 2.5 mm and the magnetic force exerted on the chain is thereby decreased by about 75%. In practice this may have as a result that in the event of more substantial fouling, the chain will remain clear of the top of the rails after having passed the fouling, because the magnetic force is not sufficient for the chain to be pulled down again.

In the bend segment according to the invention, by contrast, the distance between the top of the magnets 8',8" and the steel bearing surface is about 10 mm. In the case of the same piece of glass having a diameter of 2.5 mm, the magnetic force of attraction, upon the chain coming clear of the track as a result of the fouling, decreases only by 35%. This means, therefore, that the influence of different kinds of pollutions on the decrease of the magnetic force is considerably smaller than in the known bend for steel chains. Accordingly, the risk that the chain, upon passing a fouling, fails to return to the rails, is considerably smaller. This is of extremely great importance because, in principle, even in the bends of a transport track, no problems will occur in respect of tilting of the chain as long as the bearing surfaces of the chain links remain flat on the rails. The chain tends to tilt precisely when the bearing surfaces come off the rails as a result of a fouling. In that event, it is of great importance, on the one hand, to provide sufficient magnetic force to get the chain back into the flat position again, while, on the other hand, the magnetic force should not be too large when the chain rides flat on the rails, because otherwise the wear and the required driving force for the chain would increase unacceptably. It is greatly surprising that this object can be realized by arranging the magnets further away from the chain, which is actually precisely the opposite of what one would expect.

It appears from FIG. 2 that one of the further possible advantages of the bend segment according to the invention is that the top thereof is completely closed, so that the bend segment satisfies the strictest hygienic requirements.

Although in the embodiment according to FIG. 2 two magnets 8',8" are shown, it is, in principle, also possible to use a single magnet. The advantage of two separate magnets, however, is that the plastics rib 11 between the two magnets is a suitable location for fitting the screw 10 by means of which the closure plate 9 is affixed to the segment. Furthermore, smaller magnets are easier to handle and position.

Because the bend segment according to the invention need not undergo any aftertreatment after the magnets have been arranged, it is possible, when milling bend segments from a plate of synthetic plastics material suitable for bend segments, to simultaneously provide the so-called lead-in and lead-out portions that provide guidance of the chain into and out of the bend segment without hitching.

Figure 3:
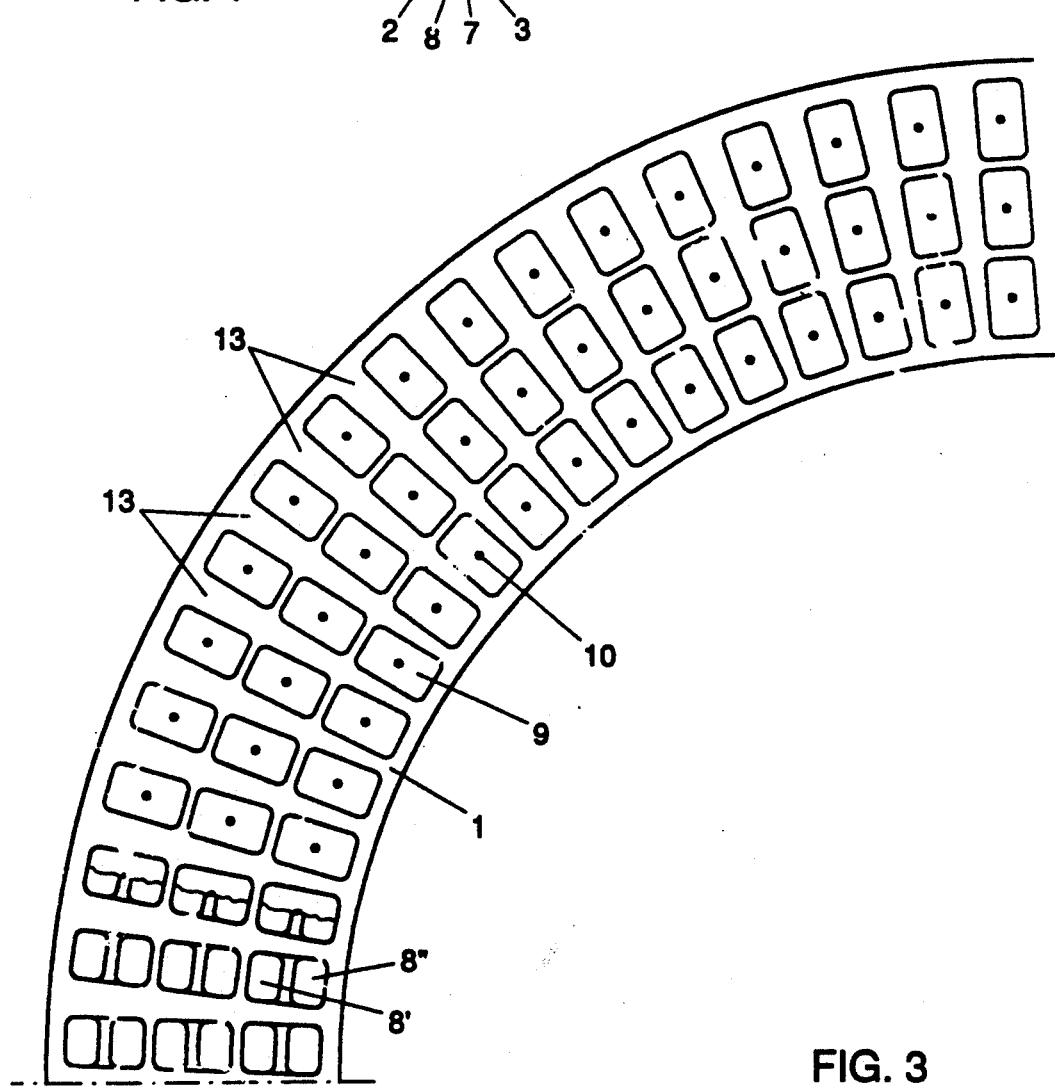
FIG. 3 is a bottom view of a triple bend segment according to the invention.

FIG. 3 shows the bottom of a triple bend segment according to the invention, i.e., a bend segment that is suitable for guiding three steel or plastics chains running side by side. For that purpose, it consists of three adjoining U-shaped elements, together forming one whole. To that end, three pairs of chambers are provided in the bottom of the bend segment, along successive radii thereof, each chamber being adapted for receiving a pair of magnets 8',8", with each pair of magnets being covered by a closure plate 9 which is affixed to the bottom of the bend segment by means of a screw 10. The radial plastics ribs 13 separating the radial rows of chambers for receiving the magnets 8',8", offer an important advantage in that the mechanical strength of the bend segment is enhanced to such an extent that the thickness of the plastics portion between the top of the magnets and the bottom of the space where the hinge loops ride, indicated at 12 in FIG. 2, can be small and therefore the overall height of the bend segment can also be chosen to be small, more specifically of a standardized value of 27 mm. Such ribs are naturally also present in the case of a single bend.

Owing to the fact that the pairs of magnets along successive radii are located in one line, it is quite simple to position a pair of magnets with the associated ferromagnetic closure plate in the successive chambers along one radius, whereafter, by displacing the machine or the bend segment over a predetermined angle, the pairs of magnets with closure plate can be arranged along the next radius.

It will be clear that it is also possible to realize in a simple manner an automatic positioning of the magnets 8',8" with their associated closure plate in the case of the single bend segment shown in FIGS. 1 and 2.

We claim:

1. A bend segment for a chain conveyor comprising a conveyor chain movable over a track including at least one bend zone, said bend segment consisting of at least one substantially U-shaped plastics element and the legs (2,3) of the U-shaped element forming the rails over which the chain can move, while said chain comprises links (4) each comprising a substantially rectangular bearing surface and a connection system (5,6) located below the bearing surface, the successive links being pivotally coupled to each other through the connection systems thereof and consisting at least partly of a magnetizable material, and permanent magnets (8) are arranged at least in the connecting portion (12) between the legs of the U-shaped element, characterized in that the permanent magnets (8) are arranged in chambers closed at the top, formed for that purpose in the bottom surface (1) of the U-shaped plastics element, said chambers being separated from each other by radially extending ribs (11), and the chambers and the magnets (8) extend in the bottom surface on opposite sides of the connecting portion over a substantial part of the width of the legs (2,3) of the U-shaped element.

2. A bend segment as claimed in claim 1, characterized in that the magnets (8) are retained in position by means of a closure plate (9) which is mounted at the bottom of the bend segment.

3. A bend segment as claimed in claim 2, characterized in that the closure plate (9) is made from a ferromagnetic material.

4. A bend segment according to claim 1, 2, or 3, characterized in that, viewed in radial direction, two magnets (8',8") are arranged side by side in two chambers separated from each other by a plastics rib (11).

5. A bend segment as claimed in claim 2 or 3, characterized in that, viewed in radial direction, two magnets are arranged side by side in two chambers separated from each other by a plastics rib, and in that one closure plate is associated with each pair of magnets, said closure plate being affixed to the plastics rib between the chambers intended for receiving one pair of magnets.

6. A bend segment as claimed in claim 1, characterized in that the bend segment consists of a plurality of adjoining substantially U-shaped plastics elements which form one whole and the permanent magnets for each bend segment are located in one line, viewed along successive radii of this multiple bend segment.

7. A bend segment as claimed in claim 6, characterized in that the magnets (8) are retained in position by means of a closure plate (9) which is mounted at the bottom of the bend segment.

8. A bend segment as claimed in claim 7, characterized in that the closure plate (9) is made from a ferromagnetic material.

9. A bend segment according to claim 6, 7, or 8, characterized in that, viewed in radial direction, two magnets (8',8") are arranged side by side in two chambers separated from each other by a plastics rib (11).

10. A bend segment as claimed in claim 7 or 8, characterized in that, viewed in radial direction, two magnets are arranged side by side in two chambers separated from each other by a plastics rib, and in that one closure plate is associated with each pair of magnets, said closure plate being affixed to the plastics rib between the chambers intended for receiving one pair of magnets.

11. A bend segment as claimed in claim 1 or 6, characterized in that the chain links are made from a magnetizable material.

12. A bend segment as claimed in claim 1 or 6, characterized in that the chain links are made from a plastics and that the connection systems of successive chain links are coupled by means of a hinge pin made from a magnetizable material.

* * * * *

UNITED STATES PATENT AND TRADEMARK OFFICE
CERTIFICATE OF CORRECTION

PATENT NO. : 5,199,551

DATED : April 6, 1993

INVENTOR(S) : Wallaart, et al

It is certified that error appears in the above-indentified patent and that said Letters Patent is hereby corrected as shown below:

Column 4, line 34, after "on", delete "T".

Signed and Sealed this

Eighth Day of February, 1994

Attest:

BRUCE LEHMAN

Attesting Officer

Commissioner of Patents and Trademarks